US008893084B2

(12) United States Patent
Parker et al.

(10) Patent No.: US 8,893,084 B2
(45) Date of Patent: Nov. 18, 2014

(54) METHODS AND APPARATUSES FOR DEFERRED OBJECT CUSTOMIZATION

(75) Inventors: Christopher T. Parker, Mountain View, CA (US); Andrew M. Matuschak, San Francisco, CA (US); Marian E. Goldeen, Three Rivers, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 13/343,590

(22) Filed: Jan. 4, 2012

(65) Prior Publication Data

US 2013/0173896 A1 Jul. 4, 2013

(51) Int. Cl.

| | |
|---|---|
| ***G09G 5/00*** | (2006.01) |
| ***G06F 17/27*** | (2006.01) |
| ***G06F 7/00*** | (2006.01) |
| ***G06F 17/00*** | (2006.01) |
| ***G06F 17/30*** | (2006.01) |
| ***G06F 15/16*** | (2006.01) |
| ***G06F 9/44*** | (2006.01) |
| ***G06F 3/00*** | (2006.01) |
| ***G06F 9/46*** | (2006.01) |
| ***G06F 13/00*** | (2006.01) |

(52) U.S. Cl.

USPC ............... 717/121; 345/619; 704/9; 706/900; 707/600; 707/756; 707/770; 709/201; 715/205; 715/264; 715/763; 717/100; 717/125; 717/127; 719/318; 719/328

(58) Field of Classification Search

CPC ............... G06F 8/24; G06F 8/35; G06F 8/38; G06F 8/313; G06F 9/542; G06F 9/4443; G06F 11/3664; G06F 12/0253; G06F 17/24; G06F 17/30607; G06F 17/30371; G06Q 10/10; G06Q 10/107; G06Q 10/06375

See application file for complete search history.

(56) References Cited

U.S. PATENT DOCUMENTS

| | | | | |
|---|---|---|---|---|
| 5,123,057 | A * | 6/1992 | Verly et al. | 706/900 |
| 5,812,122 | A * | 9/1998 | Ng | 715/703 |
| 6,442,537 | B1 | 8/2002 | Karch | |
| 6,446,060 | B1 * | 9/2002 | Bergman et al. | 707/770 |
| 6,675,230 | B1 * | 1/2004 | Lewallen | 719/328 |
| 6,870,546 | B1 * | 3/2005 | Arsenault et al. | 345/619 |
| 7,352,279 | B2 | 4/2008 | Yu et al. | |
| 7,650,344 | B2 * | 1/2010 | Snyder et al. | 707/999.1 |
| 7,941,438 | B2 * | 5/2011 | Molina-Moreno et al. | 707/756 |
| 2003/0070156 | A1 * | 4/2003 | Van Rens | 717/100 |
| 2003/0132959 | A1 * | 7/2003 | Simister et al. | 345/746 |
| 2004/0199572 | A1 * | 10/2004 | Hunt et al. | 709/201 |
| 2005/0183009 | A1 * | 8/2005 | Hannebauer et al. | 715/517 |
| 2005/0193361 | A1 * | 9/2005 | Vitanov et al. | 716/19 |
| 2008/0059877 | A1 * | 3/2008 | Brookler et al. | 715/264 |
| 2008/0071825 | A1 * | 3/2008 | Guo | 707/103 R |

(Continued)

*Primary Examiner* — Don Wong
*Assistant Examiner* — Anibal Rivera
(74) *Attorney, Agent, or Firm* — Blakely, Sokoloff, Taylor & Zafman LLP

(57) ABSTRACT

A method and apparatus to record one or more customization messages in a storage are described. Each customization message may include one or more predicates specifying applicability of the customization message for a plurality of objects. An operation on the objects may be performed to generate a configuration of a device in response to receiving an event. The configuration may include the objects. Each customization message may be selectively applied to the objects in the configuration to customize the configuration. An object may be updated via the customization message if the predicates match the object in the configuration. The device may be configured via the customized configuration.

24 Claims, 8 Drawing Sheets

100

(56) References Cited

U.S. PATENT DOCUMENTS

| | | | | |
|---|---|---|---|---|
| 2008/0091409 | A1* | 4/2008 | Anderson | 704/9 |
| 2008/0184266 | A1* | 7/2008 | Bornhoevd et al. | 719/318 |
| 2008/0275910 | A1* | 11/2008 | Molina-Moreno et al. | 707/103 R |
| 2009/0007095 | A1 | 1/2009 | Alverson et al. | |
| 2009/0217146 | A1* | 8/2009 | Goldfarb | 715/205 |
| 2009/0217185 | A1* | 8/2009 | Goldfarb | 715/763 |
| 2010/0076924 | A1* | 3/2010 | Snyder et al. | 707/600 |
| 2011/0016453 | A1* | 1/2011 | Grechanik et al. | 717/125 |
| 2011/0022431 | A1* | 1/2011 | Ameling et al. | 705/7 |
| 2012/0311539 | A1* | 12/2012 | Bullard et al. | 717/127 |

* cited by examiner

METHODS AND APPARATUSES FOR DEFERRED OBJECT CUSTOMIZATION

FIELD OF INVENTION

The present invention relates generally to constraint-based object customization.

BACKGROUND

Software application developers often rely on application programming interfaces ("APIs") to access various libraries of software code to simplify software development effort. For example, a user interface for a device may be configured by composing a variety of user interface objects provided via calling these APIs. As APIs are inherently limited by their vendors, additional customization efforts over these APIs may be required to achieve desired effects for a target configuration. As the complexity of the target configuration increases, however, such customization may become tedious.

For example, to set a particular color for each button object inside a popup control object displayed on a display device in a user interface configuration, a software developer may be required to duplicate similar color setting operations for multiple instances of button objects which are placed inside a popup control object. In certain cases, the development effort may be further complicated as relationships, such as layout relationships, between different user interface objects may not be available at the time these user interface objects are created. Although additional APIs may be provided to alleviate such development efforts, it may not be practically feasible because the number of additional APIs required may potentially explode to an unmanageable level.

Therefore, current approaches for object configuration via APIs do not provide a scalable, flexible and convenient mechanism which leverages existing APIs for customizing the configuration.

SUMMARY OF THE DESCRIPTION

In one embodiment, this invention relates to applying constraint based instructions to customize objects in a deferred manner. For example, existing APIs (application programming interface) may be leveraged as mechanisms to generate a group of objects for a configuration applicable to a device. The configuration may represent a presentation layout for a user interface, a registration for message notification, a network setting, or other applicable settings of the device. A central object, separate from the configuration, may be provided to record messages intended to update the configuration in a deferred manner. The messages recorded in the central object may be selectively sent to targeted objects of the configuration at the time of customization.

Each message recorded may include predicates to target selected (or intended) objects of the configuration when the recorded messages are applied, such as at UI (user interface) layout time. The predicates may include expressions which restrict target (or intended) objects (or receivers) based on characteristics or aspects (e.g. spatial relationships among the objects) in the configuration which may not have been available when the messages were recorded.

In some embodiments, a limited number of additional APIs (e.g. relative to existing APIs) may be available to capture intended messages for later playback to objects created via existing APIs. Intended receivers (or objects) may not have to exist before the messages are captured or collected. In one embodiment, playbacks of the captured messages for the intended objects may not occur until occurrence of a trigger (or event). Deferred configuration/re-configuration, message sending, or other delayed actions may be enabled via the capture of intended messages. In some embodiments, predicate expressions may specify constraints or conditions for determining whether a single instance of an object should or should not be updated at the time of message playback. Message playback may be coalesced based on mechanisms such as a selection expression (e.g. code evaluated to be true or false) or additional predicates.

An embodiment of the present invention includes a method and apparatus to record customization messages in a storage. Each customization message may include one or more predicates specifying applicability of the customization message for a plurality of objects. An operation on objects created for a configuration may be performed to generate the configuration applicable to a device in response to receiving an event. The configuration may include the objects. Each customization message may be selectively applied to the objects in the configuration to customize the configuration. An object may be updated via the customization message if the predicates match the object in the configuration. The device may be configured via the customized configuration.

In an alternative embodiment, a plurality of layout objects may be generated from a first set of APIs in a source specification. Customization instructions may be collected in a customization object via a second set of APIs in the source specification. Each customization instruction may include predicates indicating applicability of the customization instruction. A presentation including the layout objects may be generated in response to an event. The customization instructions from the customization object may be selectively applied on the layout objects of the presentation to update the presentation according to the predicates. The updated presentation may be displayed on a display device.

In an alternative embodiment, a plurality of layout objects and a customization object may be generated. The layout objects may represent a presentation. The customization object may include update instructions capable of updating the presentation. In response to an event, layout characteristics of the presentation may be identified to determine which of the update instructions are applicable to each layout object. The determined update instructions may be applied to the layout object to update the presentation. The updated presentation may be presented on a display device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
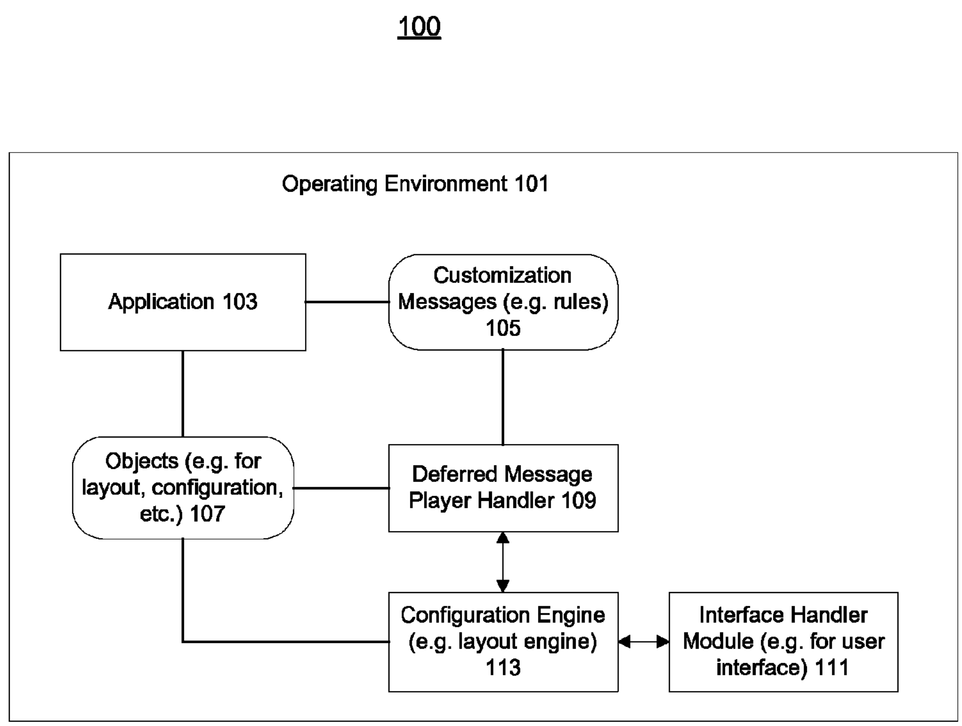
FIG. 1 is a block diagram illustrating one embodiment of system components for deferred object customization.

A method and an apparatus for deferred customization of objects are described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, deferred evaluation based on constraints or predicate expressions may be provided to customize configurations built via existing mechanisms (e.g. APIs) without a need to overly extend the existing mechanisms to achieve similar customization results. A configuration may be, for example, a user interface layout for a display device, a network configuration to enable a device to communicate with other devices, a notification registration of a device, or other applicable device configurations. In one embodiment, deferred evaluation may include customization messages later played or applied to selected objects without duplicating similar customization instructions or messages across different APIs. Deferred evaluation or action may be triggered via events internally or externally triggered.

For example, a user interface for an application may be specified via programming tools, interactive builder tools, or other applicable tools, calling existing APIs for layout objects and calling additional APIs for customization messages. In one embodiment, a source specification, such as source code or executable code, may be generated to represent the specified user interface. In one embodiment, the source specification may include instructions to create or instantiate layout objects, add APIs to the layout objects and record the customization messages to be applied to selected layout objects for customization at later time.

In one embodiment, customization messages may be recorded regardless whether targeted objects exist or not. Complexity of identifying specific objects or dependency on existence of receiving objects may be hidden from developers to customize a layout configuration or other applicable configuration. New customization options may be added/removed or edited as customization messages to an existing source specification of, for example, a layout configuration. In certain embodiments, deferred customization messages may be separately aggregated for specifying a configuration (e.g. layout presentation) to allow a developer to send customization messages and play them back against, for example, an existing configuration specification for development purposes.

Thus, customization messages may be dynamically captured to augment existing APIs, for example, related to object class, arguments, methods, etc. for building a configuration for a device. Instead of relying on identifying individual objects or targets (e.g. specific window button, control bar etc.) to individually customize (or send customization message or instruction), a deferred customization message may be recorded to be applicable to all qualified objects at the time the customization message is played back (or applied). In one embodiment large number of individual customizations may be eliminated via predicate evaluation or rule evaluation to select intended objects for customization.

As a result, the number of additional APIs needed to support individual customizations may be significantly reduced. Duplicated boilerplate code, which may be error prone, to define subclasses of objects for individual customization may be avoided. Additionally, deferred customization messages may include predicate expressions which explicitly describe conditions, constraints, or rules for the customization. Thus, software code based on the deferred customization messages may be easier to maintain to increase productivity for developers.

In one embodiment, a deferred customization system may allow an application to create user interface objects (e.g. buttons), add properties (e.g. colors) to the objects, and provide customization APIs to capture customization messages to be played at appropriate time in the future to customize the application. For example, when an interface is being laid out for the application, the system may be triggered to apply the previously recorded customization messages to find out which of the customizations are applicable for each existing layout objects.

Customization messages recorded may include expressions (e.g. predicate) explicitly describing generic attributes for intended objects or instances of objects at the time of playback. For example, predicate expression may match properties of any instance of button object to ensure applying (or sending) a corresponding customization message to all button objects in existence. A customization message may by applied independent of when or in which order the customization message is collected or recorded.

In one embodiment, predicate expressions in a customization message may be evaluated against properties of existing objects at the time of playback to determining whether an object is an intended target object for the customization message, for example, based on whether the object matches the predicate expressions. The predicate expressions may reference characteristics related to the object and/or properties of the object, which may not be available prior to the time of playback.

For example, layout buttons or other window objects in a layout presentation (e.g. a configuration) may be related with spatial relationships, such as "appear in", "overlap", "outside", "inside", or other applicable attributes/relationships, such as "portrait mode", "landscape mode" etc. These characteristics may not be known until after performing layout operations to actually lay out these objects for the layout presentation. Thus, the predicate expressions or rules may not be evaluated until the presentation has been laid out.

Deferred customization messages may be recorded for later playback without being evaluated at the time of recording. Each customization message may include customization instructions which may be applied, evaluated or played back in the future. In one embodiment, customization messages may be recorded via proxy mechanisms capable of collecting predicate expressions for the customization messages in a storage area, such as in a customization object. At the time of playback, for example, to customize a configuration, the collected customization messages may be selectively broadcasted to targeted destinations, such as objects in the configuration, which match the corresponding predicates of the customization messages in the configuration. For example, each object of the configuration may be enumerated for each customization message to determine whether the object is an intended target for the customization message.

In one embodiment, a customization message may include instructions or descriptions specifying actions or operations to perform on a target object which matches the message (e.g. based on predicate expressions of the message). The instructions may include existing or traditional APIs applicable to matching objects. Thus, a single customization message may describe the same set of actions to be performed on multiple matching objects to avoid the need to duplicate multiple messages to describe the same actions for the objects.

In one embodiment, when an application starts (e.g. executed or loaded) during start up time, customization messages may be recorded or collected without affecting any layout objects created for the application or regardless whether an layout object has or has not been yet been created for the application. Later on, during layout time of the application, when a window (or a view, an interface, a layout, a configuration, etc.) may be ready to be presented on a screen of a display device, the previously recorded messages may be evaluated on an object tree corresponding to the window to identify which customization message should be applied (or sent) to which object in the tree. The object tree may be constructed to provide a layout presentation for the window.

Deferred customization may be configured with dis-ambiguity or resolution rules (or policy) to resolve potential conflicts if multiple customization messages are identified to be applicable to an existing object at the time of message playback. For example, a button object may be painted in different colors via separate applicable customization messages (e.g. painted in red color via a first customization message and in blue color via a second customization message). However, the button object may be painted, for example, in one single color in a layout presentation. Thus, a conflict may be detected when applying these customization messages.

In one embodiment, conflict resolution may be based on an order of customization messages, such as order of entry (or recording), order of enumeration, arbitrary order or other applicable order. In certain embodiments, all applicable customization messages for an object may be sent to the object at playback time. As a result, possible conflicts may be inherently resolved according to the order the customization messages are applied (e.g. last one wins).

In one embodiment, each customization message may be associated with a specificity order to resolve conflicts identified in playing back customization messages. The specificity order may be based on partially ordered predicates associated with a customization message. For example, a predicate identifying an instance of object may be assigned a higher priority than another predicate without identifying any instance of objects. Alternatively, the more predicates a customization message has, the higher the specificity priority may be assigned. A customization message which specifically configures a single instance of an object may not be overwritten by the general configuration playback (or other customization messages).

FIG. 1 is a block diagram illustrating one embodiment of system components for deferred object customization. System 100 may include an operating environment for delayed customization 101, such as, for example, in an iPhone operating system for a cell phone device or a Mac operating system for a desktop. In one embodiment, operating environment 101 may launch (or load) application 103 to record customization message 105. Application 103 may be associated with objects 107 for a configuration, such as window objects for a user interface presentation. Each customization message may include predicate rules specifying which of target objects 107 to apply (or send) the customization message to at the time of message playback.

In one embodiment, operating environment 101 may include configuration engine 113 which is capable of performing special operations on objects 107, for example, to generate a configuration for a device. As an example, configuration engine 113 may be a layout engine to perform layout operations to determine physical layout parameters of objects 107 for presenting a user interface view or window. Generic constraints, settings, or other applicable inputs (e.g. display window size, user resizing inputs etc.) may be incorporated in generating a configuration from objects 107. In one embodiment, interface module 111 may forward a configuration (e.g. an interface presentation) from configuration engine 113 to a target device, such as a display device, a network device, or other devices capable of being configured by the configuration, coupled via interface handler 111.

Deferred message player module 109 may receive an instruction or event to perform playback customization messages 105 on objects 107. The event may be a trigger for deferred message player module 109 to start applying customization messages 105 on objects 107 from, for example, operating environment 101, application 103, or other applicable sources. In one embodiment, deferred message player module 109 may be triggered after configuration engine 113 finishes performing layout operations to layout objects 107. As a result, a configuration previously generated via configuration engine 113 from objects 107 may be customized by customization messages 105 via deferred message player module 109. Interface handler module 111 may receive the customized configuration for a target device.

In one embodiment, deferred message player module 109 may enumerate each message recorded in customization messages 105 to determine which of objects 107 are applicable for the message. For example, predicate expressions of the message may be evaluated for each object in objects 107, which may include relationships and/or parameter values or other applicable changes result from operations (e.g. layout operations) performed by configuration engine 113. For each object in objects 107, deferred message player module 109 may update the object by playing or sending applicable customization messages to the object. In certain embodiments, deferred message player module 109 may identify and resolve conflicts among applicable customization messages for the object.

Figure 2:
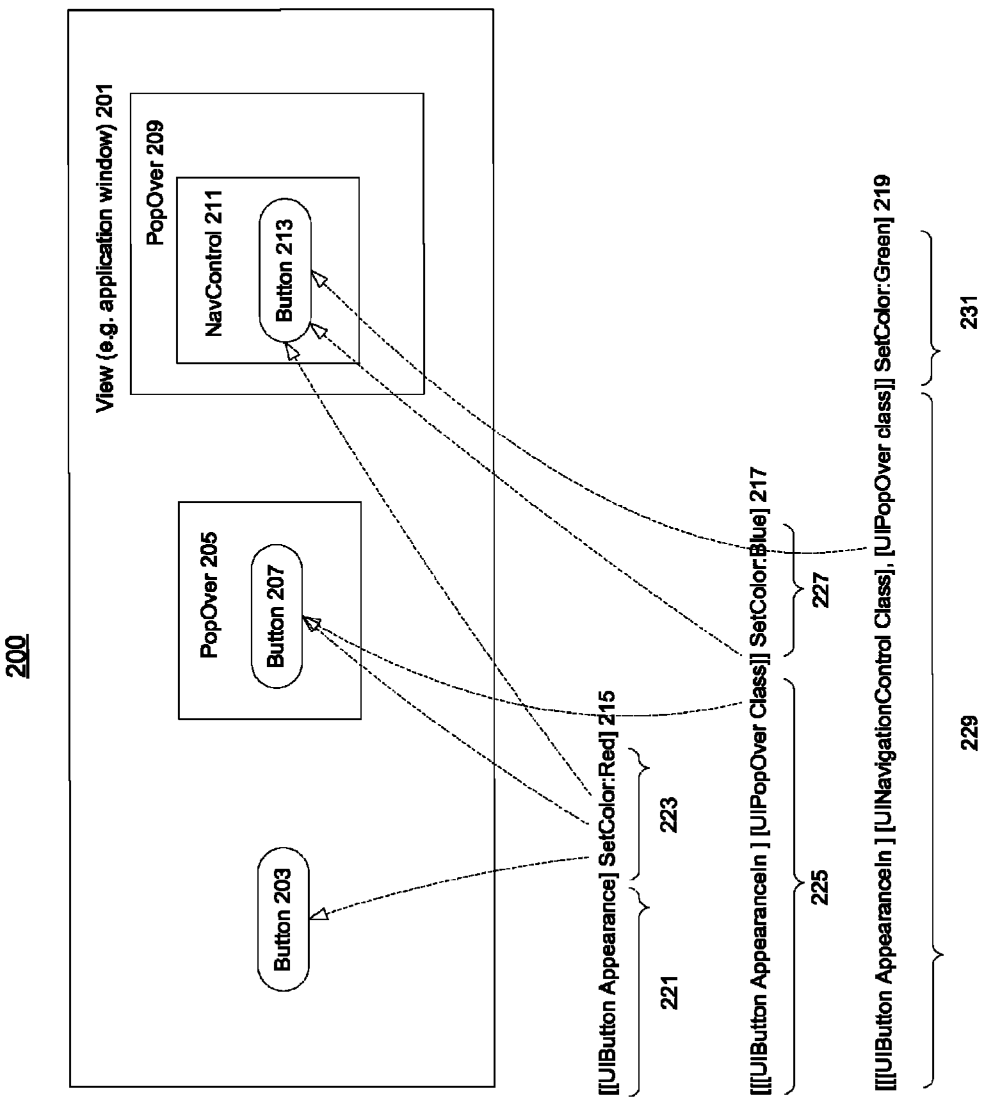
FIG. 2 illustrates one example of messages for deferred customization on a user interface in conjunction with the embodiments described herein.

FIG. 2 illustrates one example of messages for deferred customization on a user interface in conjunction with the embodiments described herein. Example 200 may include layout objects, such as view 201, button 203, popover 205, popover 209, navcontrol 211 and buttons 207, 213, which may be included in, for example, objects 107 of FIG. 1.

Layout objects of example 200 may comprise spatial relationships assigned via layout operations performed by a layout engine. For example, button 203, popover 205 and popover 209 may appear in view 201. Button 207 may appear in both popover 205 and view 201.

In one embodiment, example 200 may include customization messages 215, 217, 219, such as stored in customization messages 105 of FIG. 1. Message 215 may include predicate 221 and instruction 223. Predicate 221 may indicate that message 215 may be applicable to all button objects. Thus, at playback time, button objects 203, 207 and 213 may be identified as target objects for applying instruction 223 of message 215. Object 205, for example, which is not a button layout object, may not be applicable to message 215. In some embodiments, message 215 may indicate a default color (red) for all button objects.

Message 217 may include predicate 225 indicating applicability of instruction 227 for objects appearing in objects which are instances of object class such as "UIPopOver Class". For example, buttons 207, 213 may appear in popover 205, 209 which are instances of "UIPopOver Class". As a result, instruction 227 of message 217 may be applicable to paint button objects 207, 213 with color blue.

Alternatively, message 219 may include predicate 229 indicating applicability of instruction 231. Predicate 229 may include predicate expressions which can be evaluated against an object to be true if the object is a button object, appears in a parent object as an instance of a "UINavigationControl" object class (or type) and appears in a parent object as an instance of a "UIPopOver" object class. For example, predicate 229 may be evaluated to be true for button 213 for applying instruction 231 to paint color green to button 213.

In one embodiment, a customization message may contain playback information via predicates for a single class of object, such as UIButton class for messages 215, 217, 219. The predicates may be associated with "containment" spatial relationships to establish a hierarchy based on the "containment" relationships. At playback time (e.g. when operation "layoutsubview" is performed via a layout engine), a list of customization messages may be identified for classes (or types) of objects at one containment level to send (or play) the customization messages to relevant objects (e.g. matching message predicates).

In one embodiment, mechanisms for conflict resolutions may be invoked to determine which color should be employed for button object 207, 213 if a single color is allowed to paint one layout object. For example, a policy may be configured to select a message with more specific predicates (e.g. measured by number of conditions, atomic expressions, tests etc.). Thus, button 203 may be customized with color red via instruction 223 of customization message 215, button 207 with color blue via instruction 227 and button 213 with color green via instruction 231. Alternatively or optionally, each applicable message for an object may be applied to the object according to an order of enumeration and the last applicable message may win if there are conflicts.

In other embodiments, the applicable predicate may not be limited by expressions 221, 225. For example, a predicate may be expressed in logic forms which can include combination of logic or other applicable operations on atomic elements (e.g. expression without logic operators). A result of evaluating a predicate may be of a binary value or applicable set of predetermined values. In one embodiment, a customization instruction may include operations (or functions, routines, method etc.) applicable to update an object, as illustrated, but not limited by instructions 223, 227, 231 of example 2.

Figure 3:
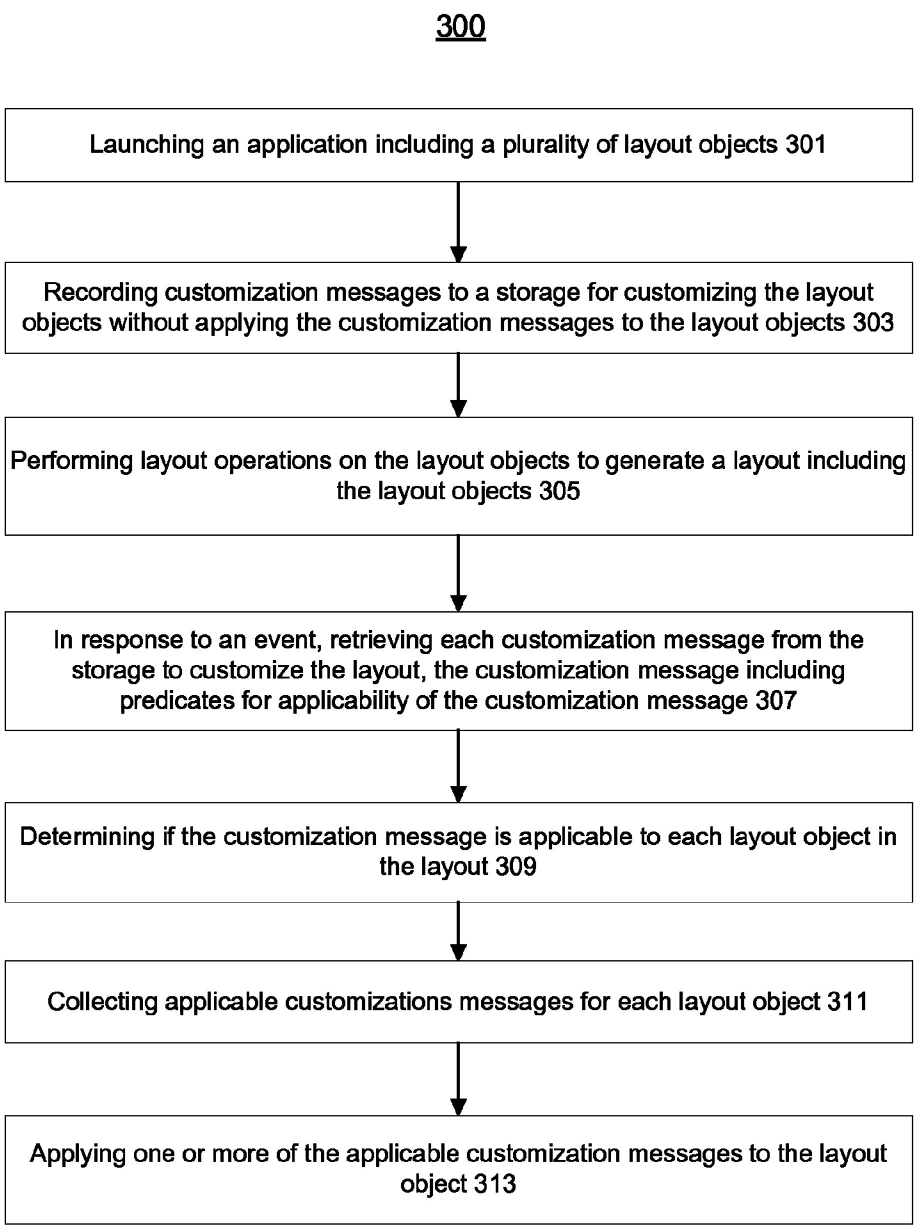
FIG. 3 is a flow diagram illustrating an embodiment of a process to customize layout objects in a deferred manner.

FIG. 3 is a flow diagram illustrating an embodiment of a process to customize layout objects in a deferred manner. Exemplary process 300 may be performed by a processing logic that may include hardware (circuitry, dedicated logic, etc.), software (such as is run on a dedicated machine), or a combination of both. For example, process 300 may be performed by system 100 of FIG. 1. At block 301, according to one embodiment, processing logic of process 300 may launch an application including a plurality of layout objects. The application may be loaded with executable and/or configuration settings including instructions specifying customization messages.

At block 303, in one embodiment, the processing logic of process 300 may execute executables of an application to record customization messages to a storage for customizing the layout objects later in a deferred manner. Optionally, the customization messages may be recorded via a process (e.g. a tool, a special executable etc.) separate from the application. The customization messages may be recorded or stored without being applied to an object. In some embodiments, whether an object or a layout object exists or not for the application may be irrelevant to recording the customization messages.

In one embodiment, at block 305, the processing logic of process 300 may perform layout operations on layout objects to generate a layout such as a window layout including the layout objects. The layout objects may be created, for example, to define or instantiate user interface components of the application at run time. In one embodiment, the processing logic of process 300 may actually assign layout parameters (e.g. coordinate positions, spatial relationships, sizes, shapes, etc.) for the layout objects via a layout engine.

In response to an event, at block 307, the processing logic of process 300 may retrieve or enumerate each customization message from a storage to customize a layout generated by a layout engine. The event may be issued once the layout engine completes layout operations on layout objects of the layout for an application. In one embodiment, the application may include a single customization object as the storage for the customization messages previously recorded. Each customization message may include predicate expressions to indicate applicability of the customization message for each layout object currently exists.

At block 309, in one embodiment, the processing logic of process 300 may determine if a customization message is applicable to each layout object in a layout or presentation laid out by a layout engine. The processing logic of process 300 may enumerate each recorded message against each existing layout object in the layout to determine applicability of the customization message, for example, based on evaluation of predicates associated with the customization message. The processing logic of process 300 may collect applicable customization messages for each layout object at block 311.

In one embodiment, at block 313, the processing logic of process 300 may update a layout object by applying applicable customization messages collected for the layout object. The processing logic of process 300 may resolve potential conflicts among the applicable customization messages for the object according to, for example, a priority order of predicates associated with the messages. Alternatively or optionally, the processing logic of process 300 may apply each applicable customization message in the order of enumeration (or time of recording) to allow a message applied later to overwrite update effects of a previously applied message. The processing logic of process 300 may forward customized layout to a display device or other applicable I/O device to present a view for an application.

In some embodiment, the processing logic of process 300, subsequent to customizing a layout via deferred customization messages, may receive another event to perform additional layout operations back at block 305. For example, a user may enter user interface commands to rearrange a window (e.g. resize a window) in a layout presentation. In response, a user interface system may activate a layout engine to perform layout operations on layout objects. As a result, the processing logic of process 300 may be notified to apply deferred customization messages on the newly laid out objects to customize the user updated presentation according to user input.

For example, a deferred customization message may set font color "red" for a window object if less than three lines of text are displayed in the window. The window may include text data in five lines of text displayed in color "black" before being resized by a user. Subsequently, a layout engine may perform layout operations to display the text data in two lines of text. The deferred customization message may be applied to set font color "red" for the text data accordingly. The user may observe the effects of color change by resizing a window corresponding to the window object.

Alternatively, additional customization methods may be added or edited for an application (or a set of applications), for example, regardless whether the application is currently running or not. Update or customization of a user interface presentation for the application may be initiated via an instruction, e.g. from a user, to send an event for the processing logic of process 300 to customize the user interface presentation. The processing logic of process 300 may automatically and dynamically pick up the newly-edited customization messages to update the user interface presentation.

Figure 4:
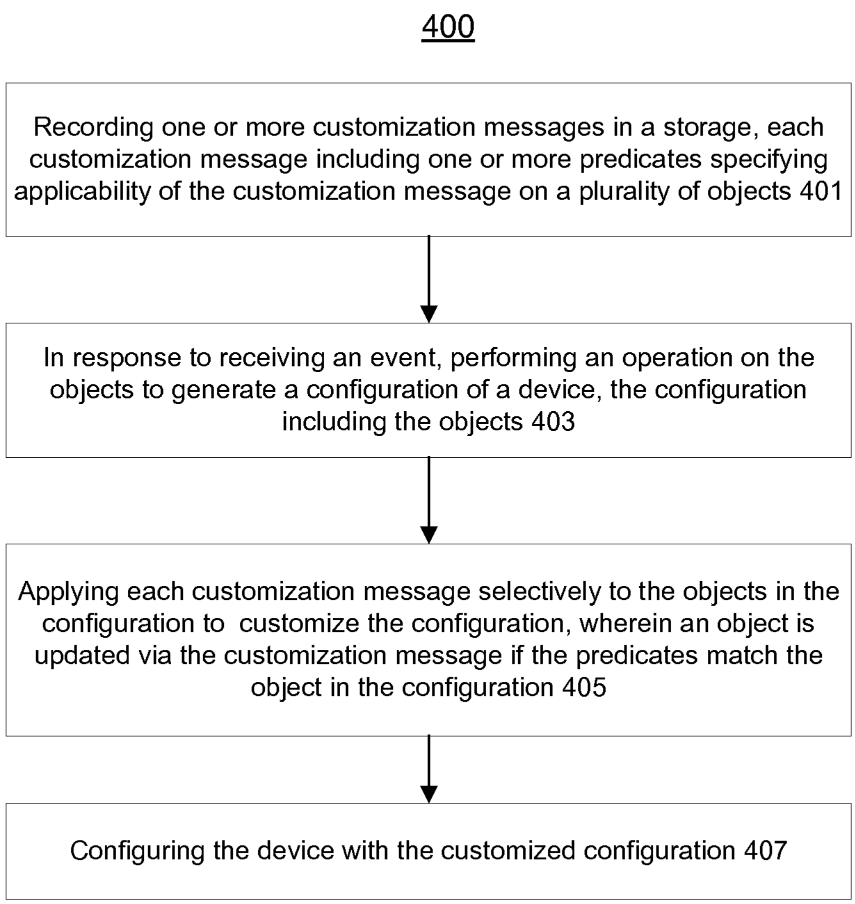
FIG. 4 is a flow diagram illustrating an embodiment of a process to record messages for deferred customization of a configuration.

FIG. 4 is a flow diagram illustrating an embodiment of a process to record messages for deferred customization of a configuration. Exemplary process 400 may be performed by a processing logic that may include hardware (circuitry, dedicated logic, etc.), software (such as is run on a dedicated machine), or a combination of both. For example, process 400 may be performed by system 100 of FIG. 1. At block 401, according to one embodiment, processing logic of process 400 may record one or more customization messages in a storage, e.g. a customization object at block 401. The storage may be later serialized (or stored) in a non-volatile storage device, such as a flash memory, hard disk etc. Each customization message may include one or more predicates specifying applicability of the customization message on a plurality of objects.

In one embodiment, the processing logic of process 400 may fetch previously compiled instructions specifying customization messages for launching an application associated with the customization messages. Instructions for the customization messages may be stored together with or separately from executable code of the application. In some embodiments, storage of customization messages may be dynamically updated during runtime of the application.

In response to receiving an event, at block 403, the processing logic of process 400 may perform an operation (or operations) on existing objects created or instantiated by an application to generate a configuration of a device, such as a user interface display configuration, a graphics window layout or other applicable configuration of the device. The configuration may include the currently existing objects with additional attribute values (e.g. layout attributes, display attributes etc.) or relationships (e.g. spatial relationships or other applicable relationships) provided via the operation.

In one embodiment, the processing logic of process 400 may apply each customization message selectively to objects in a configuration to customize the configuration. For example, the processing logic of process 400 may determine which customization messages are applicable for each layout object in a layout configuration to apply the customization message to the layout object. An object may be updated by the customization message if predicates of the customization message match the object in the configuration. At block 407, the processing logic of process 400 may forward the customized configuration to configure a device (e.g. to render a user interface presentation).

Figure 5:
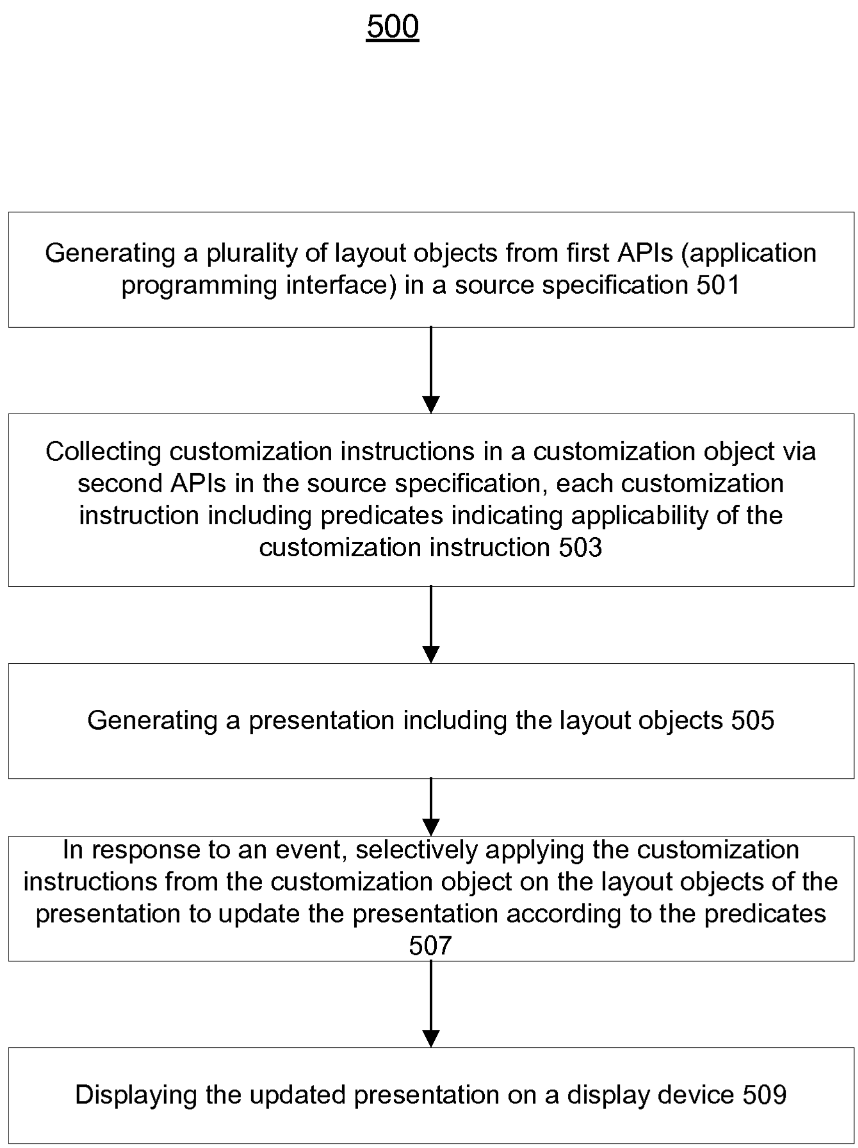
FIG. 5 is a flow diagram illustrating an embodiment of a process to apply collected customization instructions to update a presentation in response to an event.

FIG. 5 is a flow diagram illustrating an embodiment of a process to apply collected customization instructions to update a presentation in response to an event. Exemplary process 500 may be performed by a processing logic that may include hardware (circuitry, dedicated logic, etc.), software (such as is run on a dedicated machine), or a combination of both. For example, process 500 may be performed by system 100 of FIG. 1. At block 501, according to one embodiment, the processing logic of process 500 may generate layout objects from first APIs in a source specification. In one embodiment, the source specification may comprise code compiled from source code including calls to multiple APIs to provide user interface functionality for an application. The APIs may include first set of APIs which are capable of creating layout objects to interact with a user.

At block 503, the processing logic of process 500 may collect customization instructions via second APIs in a source specification for an application. A layout object may be generated via the first APIs before or after a customization instruction is collected via the second APIs. The source specification may include calls to second APIs separate from first APIs. In one embodiment, the second APIs may allow customization of layout configurations generated from the first APIs. Each customization instruction may include predicates indicating applicability of the customization instruction, for example, on instances of layout objects created via the first APIs.

At block 505, in one embodiment, the processing logic of process 500 may generate a presentation, such as a layout presentation including layout objects instantiated via first APIs of a specification. For example, the processing logic of process 500 may perform layout operations on layout objects to prepare a window view to interface with the application.

In response to an event, in one embodiment, the processing logic of process 500 may selectively apply customization instructions on layout objects of a generated layout presentation to update or customize the generated layout presentation. For example, the event may indicate that a layout engine has performed initial user interface layout and is ready to customize the initial user interface layout before sending the layout to a display device. In one embodiment, the customization instructions may be retrieved from a customization object. The processing logic of process 500 may select customization instructions for updating a layout object according to the predicates stored in the customization instructions. At block 509, the processing logic of process 500 may display the updated presentation on a display device.

Figure 6:
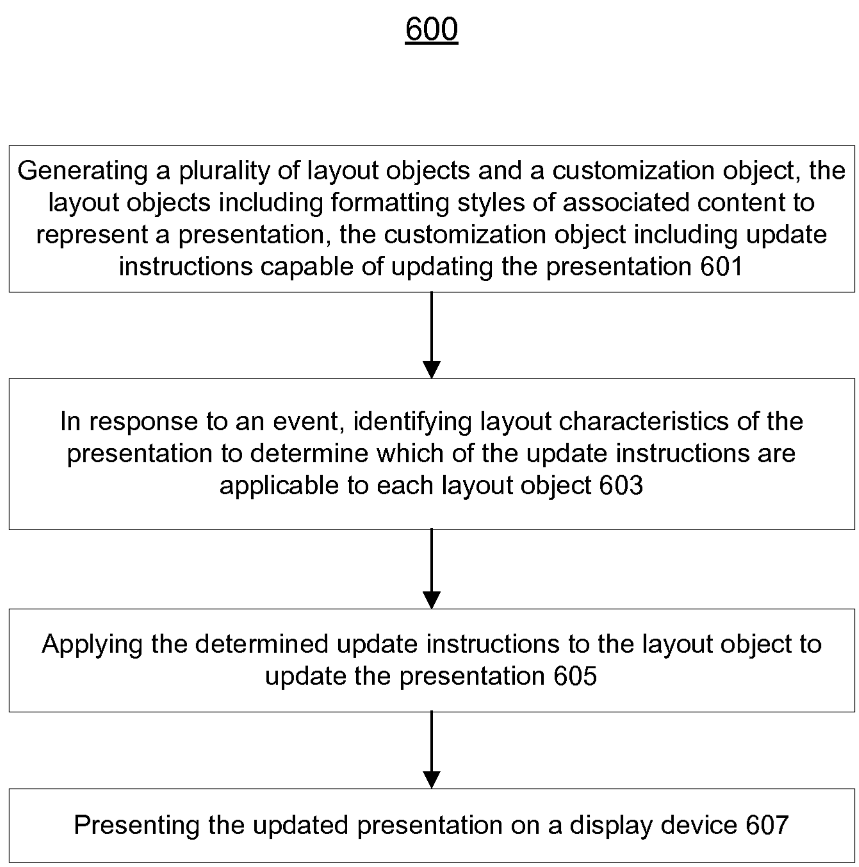
FIG. 6 is a flow diagram illustrating an embodiment of a process to selectively apply previously recorded update instructions for updating a presentation.

FIG. 6 is a flow diagram illustrating an embodiment of a process to selectively apply previously recorded update instructions for updating a presentation. Exemplary process 600 may be performed by a processing logic that may include hardware (circuitry, dedicated logic, etc.), software (such as is run on a dedicated machine), or a combination of both. For example, process 600 may be performed by system 100 of FIG. 1. At block 601, according to one embodiment, the processing logic of process 600 may generate multiple layout objects and one single customization object. The layout objects may include both formatting styles and actual content (e.g. raw text data, images, videos, etc.) associated with the formatting styles to represent a user interface presentation. For example, the layout objects may correspond to one of several presentations sharing common content in different formatting styles. The customization object may store deferred update instructions capable of updating the user interface presentation.

In response to receiving an event or trigger at block 603, the processing logic of process 600 may identify layout characteristics of a layout presentation represented by layout objects to determine which update instructions are applicable to each layout object. The processing logic of process 600 may retrieve the update instructions previously stored in a customization object. In one embodiment, the processing logic of process 600 may apply the determined update instructions to the layout object to update the presentation at block 605. Subsequently, at block 607, the processing logic of process 600 may present the updated layout presentation on a display device to enable user interface for an application.

Figure 7:
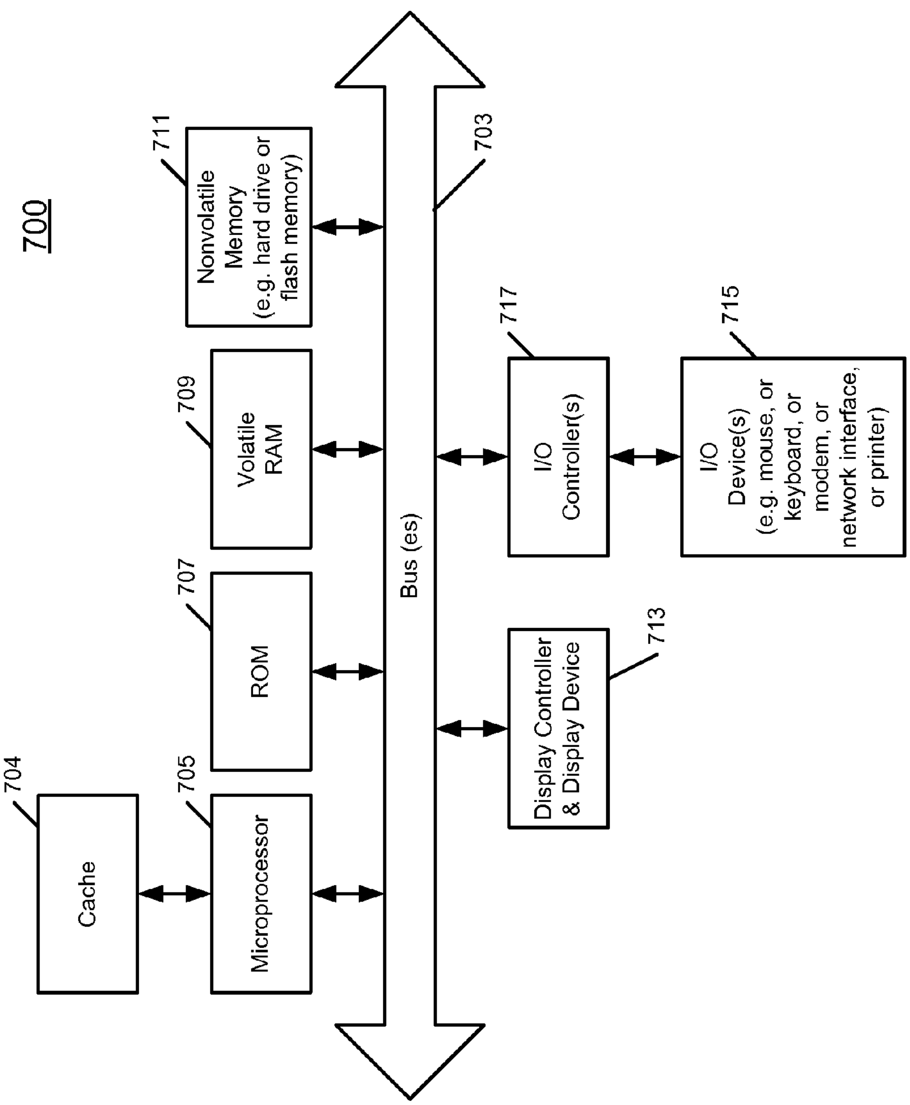
FIG. 7 illustrates one example of a typical computer system which may be used in conjunction with the embodiments described herein.

FIG. 7 shows one example of a data processing system which may be used with one embodiment the present invention. For example, the system 700 may be implemented including a host as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
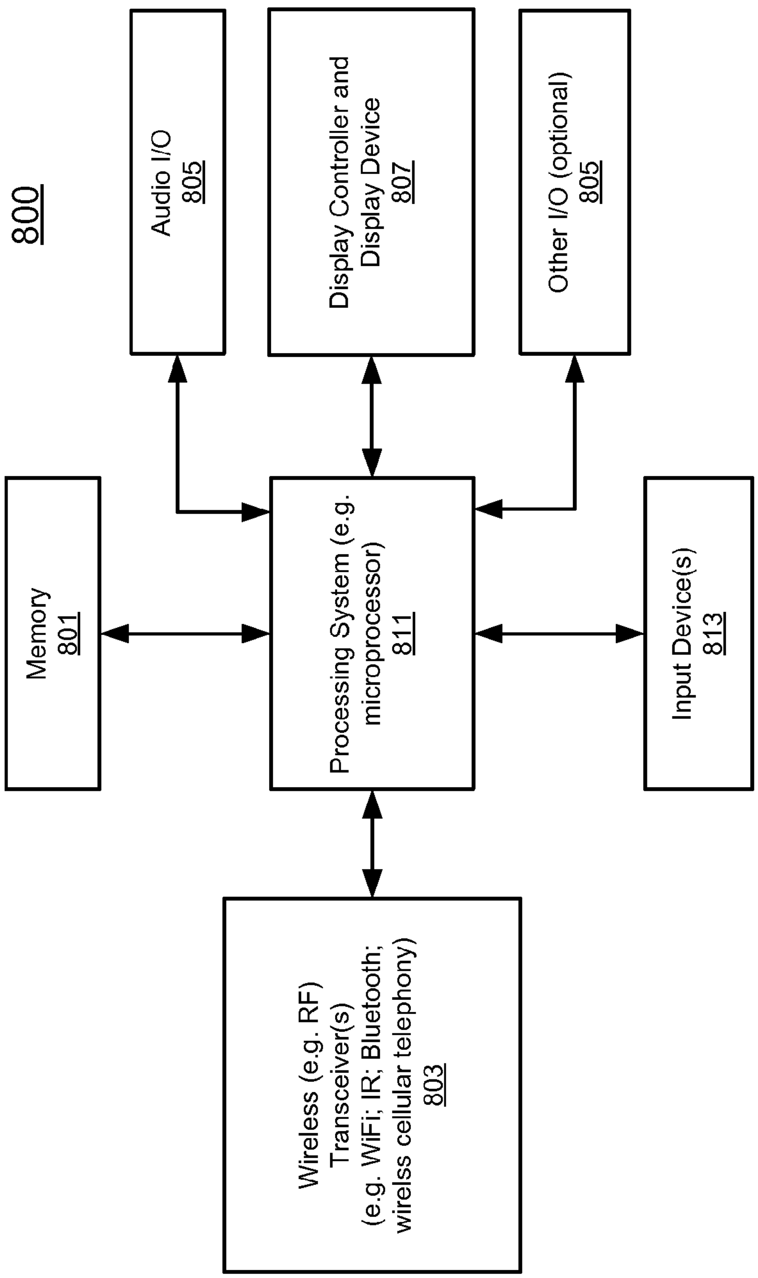
FIG. 8 shows an example of another data processing system which may be used with one embodiment of the present invention.

FIG. 8 shows an example of another data processing system which may be used with one embodiment of the present invention. For example, system 800 may be implemented as part of system as shown in FIG. 1. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805 which may include a microphone and a speaker for, for example, playing back music or providing telephone functionality through the speaker and microphone.

A display controller and display device 807 provide a visual user interface for the user; this digital interface may include a graphical user interface which is similar to that shown on an iPhone phone device or on a Macintosh computer when running OS X operating system software. The system 800 also includes one or more wireless transceivers 803 to communicate with another data processing system. A wireless transceiver may be a Wi-Fi transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system.

The data processing system 800 also includes one or more input devices 813 which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 800 may be a network computer or an embedded processing device within another device, or other types of data processing systems which have fewer components or perhaps more components than that shown in FIG. 8.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPhone, an iPod or iPod Nano media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:

recording, during a recording period, one or more customization messages in a storage;

each customization message including one or more predicates and one or more operations;

the predicates specifying applicability of the customization message for a plurality of user interface objects, the operations to be performed on the user interface objects according to the applicability of the predicates;

the recording independent of whether the user interface objects have been created, wherein the user interface objects and the customization messages are specified in source code, wherein the user interface objects are generated subsequent to the recording of the customization messages via execution of executable code generated from the source code;

generating a configuration of a device, the configuration including the user interface objects;

in response to receiving an event subsequent to the recording period, applying each customization message selectively to the user interface objects to customize the configuration according to the applicability of the predicates; and configuring the device with the customized configuration.

2. The medium of claim 1, wherein the recording comprises:

launching an application including first APIs (application programming interface); and calling the first APIs with the customization messages.

3. The medium of claim 2, wherein the storage comprises a customization object associated with the application and wherein the calling the first APIs forwards the customization messages to the customization object.

4. The medium of claim 2, wherein the application includes second APIs separate from the first APIs, the method further comprising:

calling the second APIs to generate the user interface objects without receiving the customization messages.

5. The medium of claim 1, wherein the predicates comprise constraints, and wherein the predicates match the user interface object if the user interface object in the configuration satisfies the constraints.

6. The medium of claim 5, wherein the constraints comprise expressions in first-order logic, and wherein the constraints are satisfied if the expressions are evaluated to be true with respect to the user interface object.

7. The medium of claim 5, wherein the constraints include spatial relationships between two or more objects.

8. The medium of claim 5, wherein the user interface object includes text data and wherein the constraints include attributes of the text data.

9. The medium of claim 1, further comprising:

waiting for the event subsequent to the recording of the customization messages, wherein the event is caused when the device is ready to be configured.

10. The medium of claim 1, wherein the configuration comprises user interface presentation for the application and wherein the device is a display device.

11. The medium of claim 10, wherein the operation comprises layout operation via a layout engine and wherein the layout operation provides layout characteristics to position the user interface objects in the user interface presentation.

12. The medium of claim 11, wherein the layout characteristics include a hierarchical relationship tree of the user interface objects, and wherein the hierarchical relationship tree comprises spatial relationships among the user interface objects.

13. The medium of claim 1, wherein the applying the customization message selectively comprises:

retrieving the customization message from the storage; and evaluating the predicates on each object of the configuration generated via the operation, wherein the customization message include update operations associated with the predicates.

14. The medium of claim 13, the applying the customization message selectively further comprising:

performing the update operations on the user interface object if the predicates are evaluated to be true.

15. A machine-readable non-transitory storage medium having instructions therein, which when executed by a machine, cause the machine to perform a method, the method comprising:

recording one or more customization messages in a storage;

each customization message including one or more predicates specifying applicability of the customization message for a plurality of objects;

in response to receiving an event, performing an operation on the objects to generate a configuration of a device, the configuration representing a user interface based on the objects;

applying each customization message selectively to the objects in the configuration to customize the configuration, wherein an object is updated via the customization message if the predicates match the object in the configuration;

wherein the applying the customization message selectively comprises:

retrieving the customization message from the storage;

evaluating the predicates on each object of the configuration generated via the operation, wherein the customization message includes update operations associated with the predicates;

wherein one or more applicable customization messages are collected for the object and wherein the applicable customization messages include the customization message if the predicates are evaluated to be true;

selecting one or more of the applicable customization messages for the object, the selected applicable customization messages include applicable update operations;

performing the applicable update operations on the object; and configuring the device with the customized configuration.

16. The medium of claim 15, wherein the applicable customization messages include a first customization message and a second customization message and wherein the selection comprises:

identifying if there is a conflict between the first and the second customization messages, wherein the selected applicable customization messages include only one of the first and second customization messages if the conflict is identified.

17. The medium of claim 15, wherein the objects correspond to a current configuration of the device when the event is received, wherein the event is caused by an instruction to change the current configuration of the device.

18. The medium of claim 17, wherein the device is configured with the current configuration capable of receiving user interface instructions including the instruction.

19. A machine-readable non-transitory storage medium having instructions therein, which when executed by a machine, cause the machine to perform a method, the method comprising:

generating a plurality of layout objects from first APIs (application programming interface) in a source specification;

collecting, during a recording period, customization instructions in a customization object via second APIs in the source specification;

each customization instruction including predicates and one or more operations;

the predicates indicating applicability of the operations on the layout objects;

the recording independent of whether the layout objects have been created;

generating a presentation including the layout objects;

in response to an event subsequent to the recording period, selectively applying the customization instructions from the customization object on the layout objects of the presentation to update the presentation according to the predicates; and displaying the updated presentation on a display device.

20. A machine-readable non-transitory storage medium having instructions therein, which when executed by a machine, cause the machine to perform a method, the method comprising:

generating a plurality of layout objects and a customization object;

the layout objects including formatting styles of associated content to represent a presentation;

recording, during a recording period, update instructions into the customization object;

the update instructions capable of updating the presentation;

the update instructions including one or more predicates specifying applicability of the update instructions on the layout objects based on layout characteristics of the presentation;

the recording independent of whether the layout objects have been created;

in response to an event subsequent to the recording period, identifying the layout characteristics of the presentation to determine which of the update instructions are applicable to each layout object;

applying the determined update instructions to the layout object to update the presentation; and presenting the updated presentation on a display device.

21. A computer implemented method comprising:

recording, during a recording period, one or more customization messages in a storage;

each customization message including one or more predicates and one or more operations;

the predicates specifying applicability of the customization message for a plurality of user interface objects;

the operations to be performed on the user interface objects according to the applicability of the predicates;

the recording independent of whether the user interface objects have been created, wherein the user interface objects and the customization messages are specified in source code, wherein the user interface objects are generated subsequent to the recording of the customization messages via execution of executable code generated from the source code;

generating a configuration of a device, the configuration including the user interface objects;

in response to receiving an event subsequent to the recording period, applying each customization message selectively to the user interface objects to customize the configuration according to the applicability of the predicates; and configuring the device with the customized configuration.

22. A computer implemented method comprising:

generating a plurality of layout objects from first APIs (application programming interface) in a source specification;

collecting, during a recording period, customization instructions in a customization object via second APIs in the source specification;

each customization instruction including predicates and one or more operations;

the predicates indicating applicability of the operations on the layout objects;

the recording independent of whether the layout objects have been created;

generating a presentation including the layout objects;

in response to an event subsequent to the recording period, selectively applying the customization instructions from the customization object on the layout objects of the presentation to update the presentation according to the predicates; and displaying the updated presentation on a display device.

23. A computer implemented method comprising:

generating a plurality of layout objects and a customization object;

the layout objects including formatting styles of associated content to represent a presentation;

recording, during a recording period, update instructions into the customization object;

the update instructions capable of updating the presentation;

the update instructions including one or more predicates specifying applicability of the update instructions on the layout objects based on layout characteristics of the presentation;

the recording independent of whether the layout objects have been created;

in response to an event subsequent to the recording period, identifying the layout characteristics of the presentation to determine which of the update instructions are applicable to each layout object;

applying the determined update instructions to the layout object to update the presentation; and presenting the updated presentation on a display device.

24. A computer system comprising:

a memory storing executable instructions;

an interface to a device configurable via a setting;

a processor coupled to the memory and the interface to execute the instructions from the memory, the processor being configured to:

record, during a recording period, one or more customization messages in a customization object, each customization message including one or more predicates and one or more operations;

the predicates specifying applicability of the customization message for a plurality of user interface objects;

the operations to be performed on the user interface objects according to the applicability of the predicates;

the recording independent of whether the user interface objects have been created, wherein the user interface objects and the customization messages are specified in source code and wherein the user interface objects are generated subsequent to the recording of the customization messages via execution of executable code generated from the source code;

generate a particular setting for the device, the particular setting including the user interface objects;

apply, in response to receiving an event subsequent to the recording period, each customization message selectively to the user interface objects in the particular setting to customize the particular setting according to the applicability of the predicates; and configure the device with the customized particular setting via the interface.

* * * * *